United States Patent Office 3,100,768
Patented Aug. 13, 1963

3,100,768
AZO DYESTUFFS
Raymond Gunst, Binningen, Switzerland, assignor to Ciba Limited, Basel, Switzerland, a company of Switzerland
No Drawing. Filed July 17, 1961, Ser. No. 124,361
Claims priority, application Switzerland July 17, 1959
7 Claims. (Cl. 260—153)

This is a continuation in part of my application Serial No. 17,750, filed March 28, 1960, now abandoned.

The present invention provides valuable new azo-dyestuffs which contain at least two strongly acid groups imparting solubility in water and which correspond to the formula

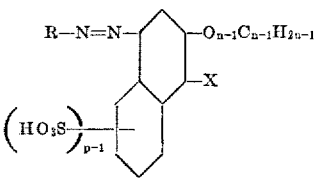

in which R represents the residue of a diazo-component free from azo-linkages, and advantageously the residue of a benzene or naphthalene sulfonic acid, $p$ and $n$ each represents the whole number 1 or 2, and X represents the radical of a halogenated 1:3:5-triazine of the formula

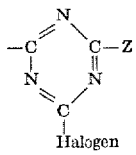

bound through an amino bridge, and especially an —NH-bridge, in which formula Z represents an anthraquinone radical of the formula

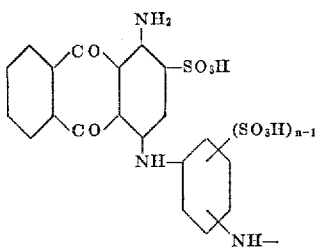

in which $n$ represents the whole number 1 or 2.

The invention also provides a process for the manufacture of the modified dyestuffs defined in the preceding paragraph, wherein a trihalogen-1:3:5-triazine, especially 2:4:6-trichloro-triazine, is condensed on the one hand with an amino-monoazo-dyestuff of the Formula 2

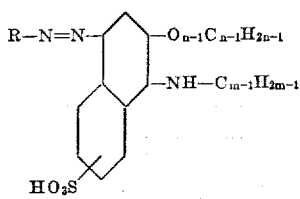

in which R and $n$ have the meanings given in connection with Formula 1, and $m$ is the whole number 1, 2 or 3, and, on the other, with an anthraquinone dyestuff of the Formula 3

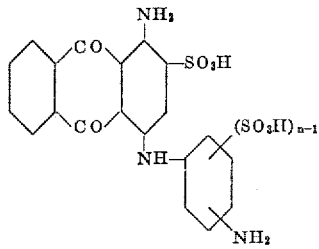

in which $n$ is the whole number 1 or 2, the condensations being carried out in either order of succession and in such manner that the triazine condensation product obtained contains halogen.

For making the starting material of the Formula 2 there are used as coupling components, for example, α-naphthylamine, 2-methoxy-1-aminonaphthalene-6 sulfonic acid, and 1-aminonaphthalene-8-sulfonic acid, or especially 1-amino-naphthalene-6- or -7-sulfonic acid.

The diazo-components to be coupled with the aforesaid coupling components contain substituents that impart solubility in water, for example, strongly acid substituents imparting solubility in water, such as sulfonic acid groups. These diazo-components may be derived from relatively simple compounds, for example, aminobenzene sulfonic acids, amino naphthalene sulfonic acids, aminopyrene sulfonic acids, chrysene sulfonic acids or aminonaphthalene sulfonic acids; especially valuable are the di- and trisulfonic acids of the naphthalene and the mono and disulfonic acids of the benzene series.

As examples of amines of which the diazo compounds are useful for coupling with the aforesaid coupling components containing acylatable amino groups there may be mentioned, for example:

1-aminobenzene-2-, -3- or -4-sulfonic acid,
1-aminobenzene-2-, -3- or -4-carboxylic acid,
1-aminobenzene-2,4- or 2,5-disulfonic acid,
2-amino-1-methoxybenzene-4-sulfonic acid,
1-amino-4-methoxybenzene-2-sulfonic acid,
3-amino-2-hydroxybenzoic acid-5-sulfonic acid,
3-amino-6-hydroxybenzoic acid-5-sulfonic acid,
2-methoxy- or 2-methyl-1-aminobenzene-4-sulfonic acid,
5-acetylamino-2-aminobenzene-1-sulfonic acid,
4-acetylamino-2-aminobenzene-1-sulfonic acid,
1-aminobenzene-3:5-disulfonic acid,
5-amino-2-nitro-benzoic acid,
2:4-dimethyl-1-aminobenzene-6-sulfonic acid,
2-methyl-4-chloro-1-aminobenzene-6-sulfonic acid,
2-aminobenzoic acid-4- or -5-sulfonic acid,
1-aminonaphthalene-4-, -5-, -6-, or -7-sulfonic acid,
2-aminonaphthalene-4-, -6-, -7- or -8-sulfonic acid,
1-aminonaphthalene-3:6-disulfonic acid,
1-aminonaphthalene-2:5:7-trisulfonic acid,
1-aminonaphthalene-2:4:8-trisulfonic acid,
1-aminonaphthalene-3:6:8-trisulfonic acid,
1-aminonaphthalene-4:6:8-trisulfonic acid,
2-aminonaphthalene-1:3:7 or 3:5:7-trisulfonic acid,
2-aminonaphthalene-4:6:8 or 3:6:8-trisulfonic acid,
2-aminonaphthalene-4:8-, 5:7- or 6:8-disulfonic acid,
1-(3'- or 4'-aminobenzoyl)-aminobenzene-3-sulfonic acid,
3-aminopyrene-8- or -10-monosulfonic acid,
3-aminopyrene-5:8- or 5:10-disulfonic acid,
4-nitro-4'-aminostilbene-2:2'-disulfonic acid, and also
O-acetyl-derivatives of aminonaphthol sulfonic acids, for example, the O-acyl-derivatives of 1-amino-8-hydroxy-naphthalene-3:6- or -4:6-disulfonic acid, dehydrothio-toluidine-mono- or disulfonic acid and the like.

The diazo compounds obtained, for example, by diazotisation with a mineral acid, especially hydrochloric acid and sodium nitrite, are coupled with the aforesaid aminonaphthalene-sulfonic acids by methods in themselves known.

The condensation of the aminomonoazo-dyestuffs so obtained with cyanuric chloride is carried out in such manner that the resulting condensation product still contains two exchangeable halogen atoms, of which one is subsequently exchanged in the process of this invention for the radical of an amino-compound of the Formula 3. As such amino-compounds there may be mentioned, for example, 1-amino-4-(3-'aminophenyl-amino)-anthraquinone-4':2-disulfonic acid and 1-amino-4-(4'-aminophenylamino)-anthraquinone-3':2-disulfonic acid, and also 1-amino-4-(3'- or 4'-aminophenylamino)-anthraquinones-2-sulfonic acid and 1-amino-4-(3'-amino-4'-methylphenylamino)-anthraquinone-2-sulfonic acid.

The condensations are advantageously carried out with the use of an acid-binding agent, such as sodium carbonate or sodium hydroxide, and under conditions such that the final product contains an exchangeable halogen atom, that is to say, they are carried out, for example, in an organic solvent or at a relatively low temperature in an aqueous medium.

The dyestuffs of this invention are suitable for dyeing and printing a very wide variety of materials, such as wool, silk, leather and polyamides, but especially fibrous cellulose-containing materials, such as linen, regenerated cellulose, and above all cotton. They are especially suitable for dyeing by the so-called pad dyeing method, in which the goods are impregnated with an aqueous dyestuff solution, which may contain a salt, and the dyestuff is fixed on the fiber by treatment with an alkali, advantageously at a raised temperature. This method and also the direct dyeing methods, which can be used with many of the dyestuffs of this invention, yield valuable dyeings that are fixed fast to washing, and by printing methods fast prints are obtained.

The dyeings and prints produced on cellulose-containing fibers with the dyestuffs of this invention are generally distinguished by their good fastness to light and above all by their excellent properties of wet fastness, especially their very good fastness to washing.

The following examples illustrate the invention, the parts and percentages being by weight:

*Example 1*

18.6 parts of cyanuric chloride are finely suspended in 300 parts of ice and 200 parts of water. There is added a neutral solution of 48.9 parts of 1-amino-4-(4'-aminophenylamino)-anthraquinone-2:3'-disulfonic acid in 500 parts of water, and the whole is stirred for two hours at 5–10° C. By the addition of a dilute solution of sodium hydroxide the pH value is maintained throughout between 6 and 7. There is then added a neutral solution of 55.6 parts of amino-azo-dyestuff obtained as described in Example 2, by diazotizing 1-amino-naphthalene-6-sulfonic acid and coupling the diazo compound with 1-amino-naphthalene-6-sulfonic acid. The reaction mixture is heated to 40° C. and stirred for six hours. By the periodic addition of a dilute solution of sodium hydroxide the pH value is maintained throughout just above 7.

By the addition of sodium chloride the dyestuff formed is precipitated, and it is then dried. It dyes cellulose fibers by the so-called pad dyeing method fast olive green tints.

*Example 2*

30.3 parts of 2-amino-naphthalene-4:8-disulfonic acid are stirred well with 300 parts of water having a temperature of 25° C., 25 parts of hydrochloric acid of 30% strength are added, and diazotization is carried out at 20° C. with 7.1 parts of sodium nitrite. After 30 minutes the diazotization is finished. There is run in at a temperature of 5–10° C. a solution, adjusted to a pH value of 7, of 22.3 parts of 1-amino-naphthalene-6-sulfonic acid in 200 parts of water. By the periodic addition of solid sodium carbonate the pH value is maintained at about 4. After stirring the mixture for 3–4 hours the coupling is finished. The coupling mixture is adjusted to a pH value of 7 with a dilute solution of sodium hydroxide, the mixture is cooled to 0° C. by the addition of ice, and the whole is added to a fine suspension of 18.6 parts of cyanuric chloride in 300 parts of ice water. The whole is stirred for two hours at 0 to 5° C., and the pH value is maintained at 5–6 by the periodic addition of a dilute solution of sodium hydroxide.

There is then added a solution, adjusted to a pH value of 7, of 48.9 parts of 1-amino-4-(4'-aminophenylamino)-anthraquinone-2:3'-disulfonic acid in 500 parts of water, and the whole is heated to 40° C. and stirred for six hours at that temperature. The pH value is maintained at about 6 throughout.

By the addition of sodium chloride the dyestuff formed is precipitated, and it is then dried. It dyes cellulose fibers by the so-called pad dyeing method or by the exhaustion method fast olive green tints.

By the methods described in Examples 1 and 2 further very similar olive to olive-green dyestuffs can be prepared by using cyanuric bromide instead of cyanuric chloride.

In the following table are given further examples of dyestuffs obtained by condensing cyanuric chloride, on the one hand with the yellow monoazo-dyestuffs given in column I and, on the other, with the anthraquinone dyestuffs mentioned in column II. In column III are given the tints of the dye or prints produced on cotton with the resulting monochlorotriazine compounds.

| I Monoazo-dyestuff | | II Anthraquinone dyestuff | III Tint |
|---|---|---|---|
| Diazo-component | Coupling component | | |
| 1-amino-2-methyl-benzene-4-sulfonic acid | 1-aminonaphthalene-6-sulfonic acid | 1-amino-4-(4'-amino-phenyl-amino)-anthraquinone-2,3'-disulfonic acid | Olive green. |
| 2-aminonaphthalene-5:7-disulfonic acid | ...do... | ...do... | Do. |
| 2-aminonaphthalene-3:6-disulfonic acid | ...do... | ...do... | Do. |
| 2-aminonaphthalene-4:8-disulfonic acid | 1-aminonaphthalene-8-sulfonic acid | ...do... | Do. |
| Do. | 1-aminonaphthalene-7-sulfonic acid | ...do... | Do. |
| Do. | ...do... | 1-amino-4-(3'-aminophenylamino)-anthraquinone-2,4'-disulfonic acid | Olive. |
| Do. | 1-aminonaphthalene-6-sulfonic acid | ...do... | Do. |
| 1-aminobenzene-2:5-disulfonic acid | ...do... | ...do... | Olive green. |
| 1-aminobenzene-3:5-disulfonic acid | ...do... | ...do... | Do. |
| 1-aminobenzene-2:5-disulfonic acid | ...do... | 1-amino-4-(4'-aminophenylamino)-anthraquinone-2,3'-disulfonic acid | Green. |
| Do. | ...do... | 1-amino-4-(4'-aminophenylamino)-anthraquinone-2-sulfonic acid | Do. |
| 1-aminonaphthalene-2:5:7-trisulfonic acid | ...do... | ...do... | Do. |
| Do. | α-Naphthylamine | 1-amino-4-(3'-aminophenylamino)-anthraquinone-2,4'-disulfonic acid | Olive. |

| I Monoazo-dyestuff | | II Anthraquinone dyestuff | III Tint |
|---|---|---|---|
| Diazo-component | Coupling component | | |
| 2-aminonaphthalene-6:8-disulfonic acid | 1-aminonaphthalene-6-sulfonic acid | 1-amino-4-(3'-aminophenylamino)-anthraquinone-2,4'-disulfonic acid. | Olive. |
| 2-aminonaphthalene-4:8-disulfonic acid | ____do____ | 1-amino-4-(4', N-methylaminophenylamino) anthraquinone-2,3'-disulfonic acid. | Do. |
| 1-aminonaphthalene-5:7-disulfonic acid | ____do____ | ____do____ | Do. |
| Mixture of the 2-aminonaphthalene-4:8- with the -6:8-disulfonic acid. | ____do____ | 1-amino-4-(3' aminophenylamino) anthraquinone-2,4'-disulfonic acid. | Do. |
| 1-aminonaphthalene-2:5:7-trisulfonic acid | α-Naphthylamine | 1-amino-4-(4'-aminophenylamino) anthraquinone-2-sulfonic acid. | Yellowish green. |

*Example 3*

2 parts of the dyestuffs obtained as described in Example 1 are dissolved in 100 parts of water. A cotton fabric is impregnated with the resulting solution at 60–80° C. on a padding machine, and the excess of liquid is squeezed off to an extent such that the material retains 75% of its weight of dyestuff solution.

The goods so impregnated are dried, and then impregnated at room temperature in a solution which contains, per liter, 10 parts of sodium hydroxide and 300 parts of sodium chloride, squeezed to a weight increase of 75%, and steamed for 60 seconds at 100–101° C. The material is then rinsed, treated with a sodium bicarbonate solution of 0.5% strength, rinsed, soaped for ¼ hour in a solution of a non-ionic detergent of 0.3% strength, rinsed and dried. There is obtained a dyeing that is fast to washing and light.

What is claimed is:

1. A watersoluble monoazo dyestuff which corresponds to the formula

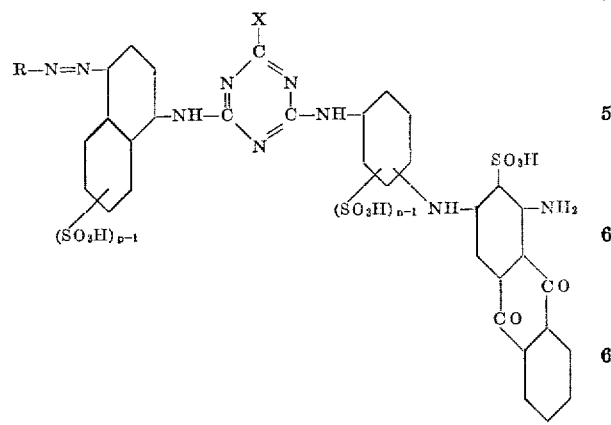

wherein $n$ and $p$ each is a whole positive number up to 2 and R represents a member selected from the group consisting of the sulfobenzene and sulfonaphthalene radicals and X a member selected from the group consisting of a bromine and a chlorine atom.

2. The dyestuffs of the formula

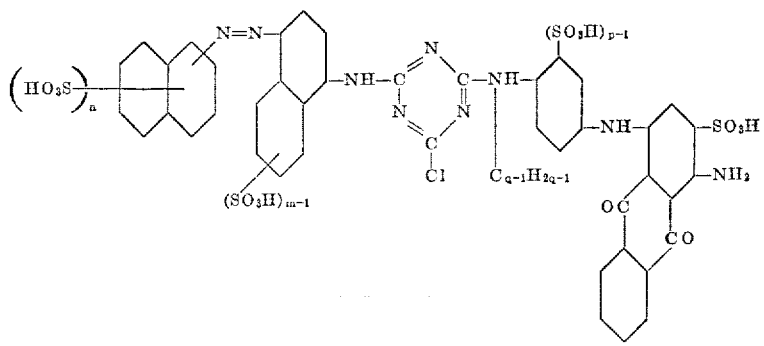

wherein $n$ is a whole positive number of at least two and at most three, $q$, $p$ and $m$ represent each a whole positive number up to and including 2, $p+m$ being at least 3.

3. A dyestuff of the formula

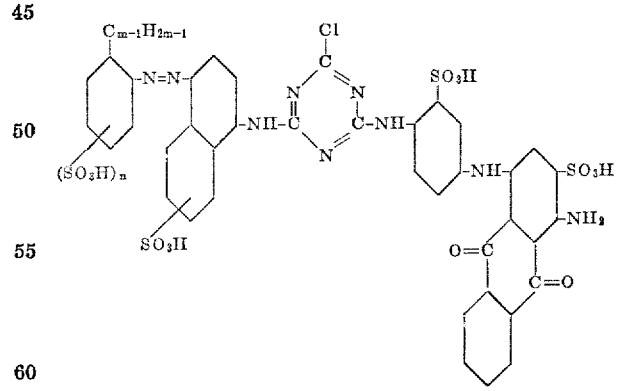

wherein $m$ and $n$ represent each a whole positive number up to and including 2.

4. The dyestuff of the formula

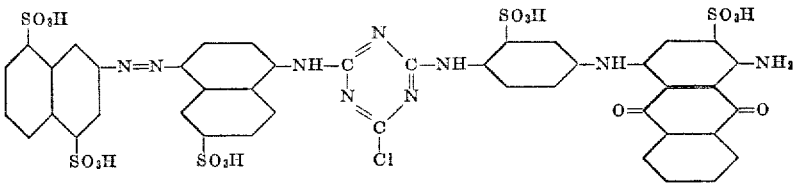

5. The dyestuff of the formula
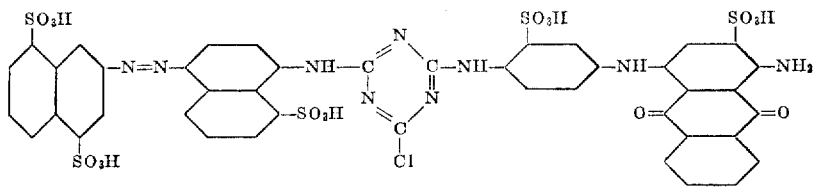
6. The dyestuff of the formula
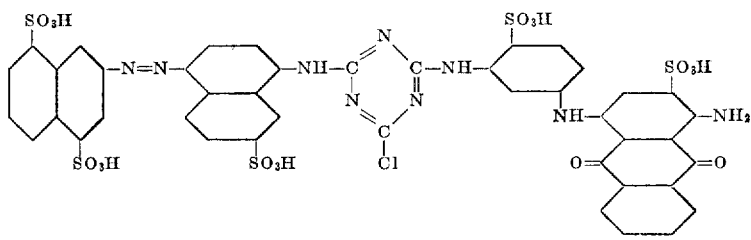
7. The dyestuff of the formula
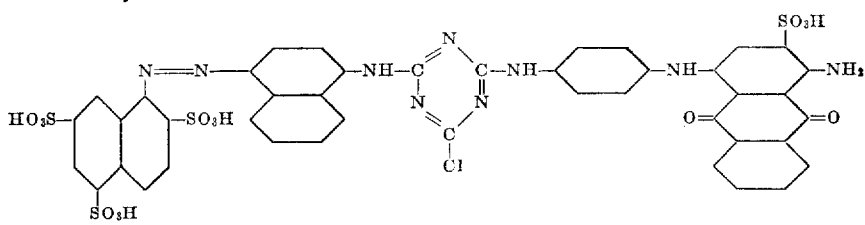
References Cited in the file of this patent
UNITED STATES PATENTS
| | | |
|---|---|---|
| 2,167,804 | Gubler et al. | Aug. 1, 1939 |
| 2,951,837 | Andrew et al. | Sept. 6, 1960 |

UNITED STATES PATENT OFFICE
CERTIFICATE OF CORRECTION

Patent No. 3,100,768　　　　　　　　　　　　　　August 13, 1963

Raymond Gunst

It is hereby certified that error appears in the above numbered patent requiring correction and that the said Letters Patent should read as corrected below.

Column 5, lines 50 to 67, the right-hand portion of the formula should appear as shown below instead of as in the patent:

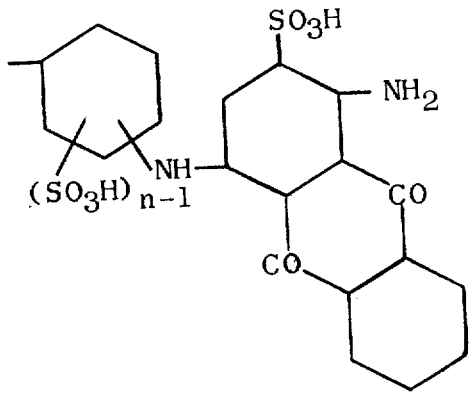

Signed and sealed this 12th day of May 1964.

(SEAL)
Attest:

ERNEST W. SWIDER
Attesting Officer

EDWARD J. BRENNER
Commissioner of Patents